United States Patent
Akai et al.

(10) Patent No.: US 11,753,520 B2
(45) Date of Patent: Sep. 12, 2023

(54) UNSATURATED POLYESTER RESIN COMPOSITION, MOLDING MATERIAL, AND MOLDED ARTICLE

(71) Applicant: JAPAN COMPOSITE CO., LTD., Tokyo (JP)

(72) Inventors: Ikuo Akai, Shizuoka (JP); Masahiro Hakotani, Shizuoka (JP)

(73) Assignee: JAPAN COMPOSITE CO., LTD., Tokyo (JP)

( * ) Notice: Subject to any disclaimer, the term of this patent is extended or adjusted under 35 U.S.C. 154(b) by 0 days.

(21) Appl. No.: 17/911,706

(22) PCT Filed: Oct. 4, 2021

(86) PCT No.: PCT/JP2021/036682
§ 371 (c)(1),
(2) Date: Sep. 15, 2022

(87) PCT Pub. No.: WO2022/075277
PCT Pub. Date: Apr. 14, 2022

(65) Prior Publication Data
US 2023/0227623 A1    Jul. 20, 2023

(30) Foreign Application Priority Data
Oct. 6, 2020    (JP) .................. 2020-169180

(51) Int. Cl.
*C08K 3/04* (2006.01)
*C08K 3/22* (2006.01)
*C08J 5/04* (2006.01)

(52) U.S. Cl.
CPC .................. *C08K 3/04* (2013.01); *C08J 5/043* (2013.01); *C08K 3/22* (2013.01); *C08J 2367/07* (2013.01); *C08K 2003/2227* (2013.01)

(58) Field of Classification Search
CPC .... C08K 3/04; C08K 3/22; C08K 2003/2227; C08J 5/043; C08J 2367/07
USPC ........................................... 524/437
See application file for complete search history.

(56) References Cited

U.S. PATENT DOCUMENTS

| | | | |
|---|---|---|---|
| 5,810,914 A * | 9/1998 | Okisaki | C08L 77/00 524/415 |
| 2008/0210914 A1* | 9/2008 | Hansel | C08K 5/5205 252/609 |
| 2015/0337204 A1* | 11/2015 | Yamazaki | C08K 5/5205 252/609 |

FOREIGN PATENT DOCUMENTS

| | | |
|---|---|---|
| JP | 08-067771 | 3/1996 |
| JP | 09-296119 | 11/1997 |
| JP | 2005-23192 A | 1/2005 |
| JP | 2006-029023 | 2/2006 |
| JP | 2007-054617 | 3/2007 |
| JP | 2013-103104 | 5/2013 |

* cited by examiner

*Primary Examiner* — Kelechi C Egwim
(74) *Attorney, Agent, or Firm* — Rankin, Hill & Clark LLP

(57) ABSTRACT

An unsaturated polyester resin composition includes a resin component containing an unsaturated polyester and a polymerizable monomer, an aluminum hydroxide, and an expandable graphite. The mixing ratio of the aluminum hydroxide to 100 parts by mass of the resin component is 50 parts by mass or more and 300 parts by mass or less. The mixing ratio of the expandable graphite to 100 parts by mass of the resin component is 3 parts by mass or more and 10 parts by mass or less. The expandable graphite has an average particle size of 150 μm or less.

5 Claims, No Drawings

UNSATURATED POLYESTER RESIN COMPOSITION, MOLDING MATERIAL, AND MOLDED ARTICLE

The present invention relates to an unsaturated polyester resin composition, a molding material, and a molded article, and in particular to an unsaturated polyester resin composition, a molding material containing the unsaturated polyester resin composition, and a molded article including a cured product of the molding material.

BACKGROUND ART

Conventionally, a molded article made of a molding material including an unsaturated polyester resin (particularly, a sheet molding compound (SMC)) has been used in a variety of fields due to its excellent appearance, mechanical properties, water resistance, and corrosion resistance.

Among the molding materials described above, for example, a molding material including unsaturated polyester resin, aluminum hydroxide, expandable graphite, and glass fiber has been proposed as a molding material that exhibits excellent flame retardancy (for example, Patent document 1 (Example 1) below).

CITATION LIST

Patent Document

Patent Document 1: Japanese Unexamined Patent Publication No. 2005-23192

SUMMARY OF THE INVENTION

Problem to be Solved by the Invention

With vehicle electrification, vehicles have been equipped with high-capacity batteries in these years. For weight reduction, the resinification of the casing of the battery (battery case) has been advancing. The resin used for the battery cases is required to simultaneously have excellent flame retardancy and mechanical properties to prevent the damage to the battery caused by a vehicle fire or a collision.

Molded articles made of the molding materials described in Examples of Patent Document 1 exhibit excellent flame retardancy but, in contrast, disadvantageously show low mechanical properties.

The present invention aims to provide an unsaturated polyester resin composition with excellent flame retardancy and mechanical properties, a molding material including the unsaturated polyester resin composition, and a molded article including a cured product of the molding material.

Means for Solving the Problem

After careful consideration, the inventors has arrived at the present invention by finding out that an unsaturated polyester resin composition with excellent flame retardancy and mechanical properties, a molding material including the unsaturated polyester resin composition, and a molded article including a cured product of the molding material are produced by optimizing the mixing ratio of the aluminum hydroxide, the mixing ratio of the expandable graphite, and the average particle size of the expandable graphite.

The present invention [1] includes an unsaturated polyester resin composition comprising: a resin component containing an unsaturated polyester and a polymerizable monomer; an aluminum hydroxide; and an expandable graphite, wherein a mixing ratio of the aluminum hydroxide to 100 parts by mass of the resin component is 50 parts by mass or more and 300 parts by mass or less, a mixing ratio of the expandable graphite to 100 parts by mass of the resin component is 3 parts by mass or more and 10 parts by mass or less, and an average particle size of the expandable graphite is 150 μm or less.

The present invention [2] includes the unsaturated polyester resin composition described in [1], further comprising a wetting and dispersing agent, wherein the wetting and dispersing agent is an alkylammonium salt.

The present invention [3] includes a molding material comprising: the unsaturated polyester resin composition described in [1] or [2]; and a reinforcing fiber.

The present invention [4] includes the molding material described in [3], being a sheet molding compound.

The present invention [5] includes a molded article comprising a cured product of the molding material described in [3] or [4].

Effects of the Invention

The unsaturated polyester resin composition of the present invention includes a predetermined ratio of aluminum hydroxide and a predetermined ratio of expandable graphite. The expandable graphite has a predetermined average particle size.

Thus, the molded article obtained by using the unsaturated polyester resin composition has excellent flame retardancy and mechanical properties.

The molding material of the present invention includes the unsaturated polyester resin composition of the present invention. Thus, the molded article obtained by using the molding material has excellent flame retardancy and mechanical properties.

The molded article of the present invention includes a cured product of the molding material of the present invention. Thus, the molded article of the present invention has excellent flame retardancy and mechanical properties.

DESCRIPTION OF THE EMBODIMENTS

The unsaturated polyester resin composition of the present invention includes a resin component, aluminum hydroxide, and expandable graphite.

The resin component includes an unsaturated polyester and a polymerizable monomer.

The unsaturated polyester is a polymerization product of a polybasic acid and a polyhydric alcohol.

The polybasic acid contains a polybasic acid that has an ethylenically unsaturated double bond (hereinafter, referred to as an ethylenically unsaturated bond-containing polybasic acid) as an essential component, and a polybasic acid that does not have an ethylenically unsaturated double bond (hereinafter, referred to as an ethylenically unsaturated bond-free polybasic acid) as an optional component.

Examples of the ethylenically unsaturated bond-containing polybasic acid include an ethylenically unsaturated aliphatic dibasic acid, halogenated products of ethylenically unsaturated aliphatic dibasic acid, and alkyl esters of ethylenically unsaturated aliphatic dibasic acid.

Examples of the ethylenically unsaturated aliphatic dibasic acid include maleic acid, fumaric acid, itaconic acid, and dihydromuconic acid. Further, examples of the ethylenically unsaturated aliphatic dibasic acid include acid anhydrides derived from the above-described ethylenically unsaturated aliphatic dibasic acid. Examples of the anhydrides derived from the ethylenically unsaturated aliphatic dibasic acid include maleic anhydrides. As the ethylenically unsaturated bond-containing polybasic acid, maleic anhydrides and fumaric acids are preferable.

Examples of the ethylenically unsaturated bond-free polybasic acid include saturated aliphatic polybasic acid, saturated alicyclic polybasic acid, aromatic polybasic acid, halogenated products of these acids, and alkyl esters of these acids.

Examples of the saturated aliphatic polybasic acid include saturated aliphatic dibasic acids.

Examples of the saturated aliphatic dibasic acids include oxalic acid, malonic acid, succinic acid, methylsuccinic acid, 2,2-dimethyl succinic acid, 2,3-dimethyl succinic acid, hexylsuccinic acid, glutaric acid, 2-methylglutaric acid, 3-methylglutaric acid, 2,2-dimethylglutaric acid, 3,3-dimethylsuccinic acid, adipic acid, pimelic acid, suberic acid, azelaic acid, and sebacic acid. Examples of the saturated aliphatic polybasic acid include acid anhydrides derived from the above-described saturated aliphatic dibasic acids. Examples of the acid anhydrides derived from the saturated aliphatic dibasic acids include oxalic anhydrides and succinic anhydrides.

Examples of the saturated alicyclic polybasic acid include saturated alicyclic dibasic acids.

Examples of the saturated alicyclic dibasic acids include HET acid, 1,2-hexahydrophthalic acid, 1,1-cyclobutanedicarboxylic acid, 1,4-cyclohexanedicarboxylic acid (cis- or trans-1,4-cyclohexanedicarboxylic acid or a mixture thereof), and dimer acid. Examples of the saturated alicyclic polybasic acid include acid anhydrides derived from the above-described saturated alicyclic dibasic acids. Examples of the acid anhydrides derived from the above-described saturated alicyclic dibasic acids include HET anhydrides.

Examples of the aromatic polybasic acids include aromatic dibasic acids.

Examples of the aromatic dibasic acids include phthalic acid (orthophthalic acid, isophthalic acid, and terephthalic acid), trimellitic acid, and pyromellitic acid. Further, examples of the aromatic polybasic acids include acid anhydrides derived from the above-described aromatic dibasic acids. Examples of the acid anhydrides derived from aromatic dibasic acids include phthalic anhydrides.

As the ethylenically unsaturated bond-free polybasic acid, preferably an aromatic polybasic acid, more preferably an aromatic dibasic acid, further more preferably a phthalic acid, particularly preferably an isophthalic acid is used.

These polybasic acids can be used alone or in combination of two or more.

When the polybasic acid includes an ethylenically unsaturated bond-containing polybasic acid and an ethylenically unsaturated bond-free polybasic acid, the mixing ratio of the ethylenically unsaturated bond-containing polybasic acid to the polybasic acid is, for example, 50 mol % or more, preferably 60 mol % or more, and, for example, 99 mol % or less, preferably 80 mol % or less.

Preferably, the polybasic acid does not include an ethylenically unsaturated bond-free polybasic acid. In other words, preferably, the polybasic acid includes only an ethylenically unsaturated bond-containing polybasic acid.

Examples of the polyhydric alcohol include dihydric alcohols, trihydric alcohols, tetrahydric alcohols, pentahydric alcohols, and hexahydric alcohols.

Examples of the dihydric alcohols include aliphatic diols, alicyclic diols, and aromatic diols. Examples of the aliphatic diols include alkane diols and ether diols. Examples of the alkane diols include ethylene glycol, propylene glycol (1,2- or 1,3-propanediol or a mixture thereof), butylene glycol (1,2-, 1,3-, or 1,4-butylene glycol or a mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentanediol, and 3,3-dimethylolheptane. Examples of the ether diols include diethylene glycol, triethylene glycol, and dipropylene glycol. Examples of the alicyclic diols include cyclohexanediol (1,2-, 1,3-, or 1,4-cyclohexanediol or a mixture thereof), cyclohexanedimethanol (1,2-, 1,3-, or 1,4-cyclohexanedimethanol or a mixture thereof), cyclohexanediethanol (1,2-, 1,3-, or 1,4-cyclohexanediethanol or a mixture thereof), and hydrogenated bisphenol A. Examples of the aromatic diols include bisphenol A, ethylene oxide adduct of bisphenol A, and propylene oxide adduct of bisphenol A.

Examples of the trihydric alcohols include glycerin, trimethylolpropane, and triisopropanolamine.

Examples of the tetrahydric alcohols include tetramethylolmethane (pentaerythritol) and diglycerin.

Examples of the pentahydric alcohols include xylitol.

Examples of the hexahydric alcohols include sorbitol, mannitol, allitol, iditol, darcitol, altritol, inositol, and dipentaerythritol.

As the polyhydric alcohol, preferably a dihydric alcohol, more preferably an aliphatic diol, even more preferably an alkane diol, particularly preferably propylene glycol and neopentyl glycol is/are used.

These polyhydric alcohols may be used alone or in combination of two or more. Preferably, the polyhydric alcohol includes propylene glycol and neopentyl glycol.

The unsaturated polyester is obtained by polycondensation (condensation polymerization) of a polybasic acid with a polyhydric alcohol.

To carry out the polycondensation (condensation polymerization) of the polybasic acid and the polyhydric alcohol, the polybasic acid and the polyhydric alcohol are mixed in the following equivalent ratio.

The equivalent ratio (hydroxyl group of the polyhydric alcohol/carboxyl group of the polybasic acid) of the polyhydric alcohol to the polybasic acid is, for example, 0.9 or more, preferably 0.95 or more, and, for example, 1.2 or less, preferably 1.1 or less.

After mixing the polybasic acid and the polyhydric alcohol, the obtained mixture is stirred at a normal pressure under a nitrogen atmosphere to react the polybasic acid with the polyhydric alcohol. The reaction temperature is, for example, 150° C. or more, preferably 190° C. or more, and, for example, 250° C. or less, preferably 230° C. or less. The reaction time is, for example, 8 hours or more, and, for example, 30 hours or less.

In the above-described reaction, as necessary, a known solvent and a known catalyst can be blended to the mixture.

In this manner, an unsaturated polyester is produced.

The acid value of the unsaturated polyester (measurement method: in conformity with JIS K6901 (2008)) is, for example, 20 mg/KOH/g or more, preferably 25 mg/KOH/g or more, and, for example, less than 40 mg/KOH/g, preferably 30 mg/KOH/g or less.

The weight average molecular weight of the unsaturated polyester is, for example, 4000 or more, preferably 6000 or more, and, for example, 25000 or less, preferably 20000 or less.

The weight average molecular weight is a weight average molecular weight in terms of polystyrene by GPC (gel permeation chromatography). The weight average molecular weight can be determined by GPC measurement of the unsaturated polyester.

The mixing ratio of the unsaturated polyester to 100 parts by mass of the resin component is, for example, 20 parts by mass or more, preferably 30 parts by mass or more, and, for example, 80 parts by mass or less, preferably 70 parts by mass or less.

The polymerizable monomer is a solvent for dissolving the unsaturated polyester. Further, the polymerizable monomer is a cross-linkable monomer (reactive diluent) cross-linkable with the unsaturated polyester at the time of curing of the unsaturated polyester resin (described later).

Examples of the polymerizable monomer include styrene-based monomers, (meth)acrylic acid ester-based monomers, and allyl-based monomers.

Examples of the styrene-based monomers include styrene, α-methyl styrene, α-ethyl styrene, vinyltoluene, t-butylstyrene, and chlorostyrene.

Examples of the (meth)acrylic acid ester-based monomers include alkyl (meth)acrylate, allyl (meth)acrylate, cyclic structure-containing (meth)acrylate, hydroxyl alkyl (meth)acrylate, alkoxy alkyl (meth)acrylate, amino alkyl (meth)acrylate, fluoroalkyl (meth)acrylate, and polyfunctional (meth)acrylate. Examples of the alkyl (meth)acrylates includes methyl (meth)acrylate, ethyl (meth)acrylate, isopropyl (meth)acrylate, butyl (meth)acrylate, n-butyl (meth)acrylate, t-butyl (meth)acrylate, isobutyl (meth)acrylate), 2-ethylhexyl (meth)acrylate, lauryl (meth)acrylate, tridecyl (meth)acrylate, and stearyl (meth)acrylate. Examples of the allyl (meth)acrylate esters include allyl (meth)acrylate. Examples of the cyclic structure-containing (meth)acrylates include cyclohexyl (meth)acrylate, benzyl (meth)acrylate, isobornyl (meth)acrylate, glycidyl (meth)acrylate, tetrahydrofurfuryl (meth)acrylate, dicyclopentenyl (meth)acrylate, dicyclopentanyl (meth)acrylate, and dicyclopentenyloxyethyl (meth)acrylate. Examples of the hydroxyl alkyl (meth)acrylates include 2-hydroxyethyl (meth)acrylate and 2-hydroxypropyl (meth)acrylate. Examples of the alkoxy alkyl (meth)acrylates such as 2-methoxyethyl (meth)acrylate and 2-ethoxyethyl (meth)acrylate. Examples of the amino alkyl (meth)acrylates include dimethyl amino ethyl (meth)acrylate and diethyl amino ethyl (meth)acrylate and chloride salts of these. Examples of the fluoroalkyl (meth)acrylates include trifluoroethyl (meth)acrylate and heptadecafluorodecyl (meth)acrylate. Examples of the polyfunctional (meth)acrylates include ethylene glycol di(meth)acrylate, diethylene glycol di(meth)acrylate, trimethylolpropane tri(meth)acrylate, pentaerythritol tetra(meth)acrylate, and dipentaerythritol hexa(meth)acrylate.

Examples of the allyl-based monomers include glycerin monoallyl ethers, pentaerythritol diallyl ethers, pentaerythritol monoallyl ethers, and trimethylolpropane monoallyl ethers.

As the polymerizable monomer, preferably a styrene-based monomer, more preferably a styrene is used.

These polymerizable monomers can be used alone or in combination of two or more.

The resin component preferably includes a vinyl ester.

The vinyl ester is a reaction product of an epoxy resin and an unsaturated monobasic acid.

Examples of the epoxy resin include bisphenol epoxy resins and novolac-type epoxy resins.

Examples of the bisphenol epoxy resin include a reaction product of a phenol component and an epoxy component. Examples of the phenol component include bisphenol compounds (for example, bisphenol A). Examples of the epoxy component include a bisphenol A epoxy compound.

To produce a bisphenol epoxy resin, the phenol component is reacted with the epoxy component. Specifically, the phenol component and the epoxy component are mixed and reacted.

In the above-described reaction, the mixing ratio of the epoxy component to 1 equivalent of the phenol component is, for example, 1.5 equivalents or more, preferably 2.0 equivalents or more, more preferably 3.0 equivalents or more, and, for example, 5.0 equivalents or less, preferably 4.0 equivalents or less.

In the above-described reaction, as necessary, a catalyst can be added to the mixture.

Examples of the catalyst include amines, quaternary ammonium salts, imidazoles, and phosphines. Examples of the amines include trimethylamine and benzyldimethylamine. Examples of the quaternary ammonium salts include tetramethylammonium chloride and triethylbenzylammonium chloride. Examples of the imidazoles include 2-ethyl-4-imidazole. Examples of the phosphines include triphenylphosphine.

As the catalyst, preferably a quaternary ammonium salt, more preferably a triethylbenzylammonium chloride is used.

These catalysts may be used alone or in combination of two or more.

The mixing ratio of the catalyst to 100 parts by mass of the total amount of the phenol component and the epoxy component is, for example, 0.01 parts by mass or more, and, for example, 1.0 part by mass or less, preferably 0.1 parts by mass or less.

In the above-described reaction, the reaction temperature is, for example, 100° C. or more, preferably 130° C. or more, and, for example, 180° C. or less.

In the above-described reaction, the reaction time is, for example, 1 hour or more, preferably 3 hours or more, and, for example, 10 hours or less, preferably 7 hours or less.

In this manner, a bisphenol epoxy resin is produced.

The epoxy equivalent of the bisphenol epoxy resin is, for example, 100 g/eq or more, preferably 250 g/eq or more, and, for example, 800 g/eq or less, preferably 400 g/eq or less, more preferably 350 g/eq or less.

When two types of the bisphenol epoxy resins are used in combination, the epoxy equivalent is an epoxy equivalent of all the bisphenol epoxy resins obtained by multiplying the epoxy equivalent of each of the bisphenol epoxy resins by the mass ratio of each of the bisphenol epoxy resins to the total amount of the bisphenol epoxy resins and adding up the products of the epoxy equivalents and the mass ratios.

In the above description, the bisphenol epoxy resin is a reaction product of a phenol component and an epoxy component but is not limited to the above. The bisphenol epoxy resin may be a reaction product of a phenol component and an epichlorohydrin. Preferably, the bisphenol epoxy resin is a reaction product of a phenol component and an epoxy component.

The novolac-type epoxy resin is, for example, a reaction product of a novolac and an epichlorohydrin.

Alternatively, a commercially available product can be used as the epoxy resin. An epoxy resin of which chain is extended by a phenol compound can be used.

Examples of the unsaturated monobasic acid include monocarboxylic acids and a reaction product of a dibasic acid anhydride and an alcohol having at least one unsaturated group in a molecule.

Examples of the monocarboxylic acids include (meth) acrylic acid, crotonic acid, cinnamic acid, and sorbic acid. Used herein, the "(meth)acryl" refers to methacryl and/or acryl.

Examples of the dibasic acid anhydride include maleic anhydride, succinic anhydride, phthalic anhydride, tetrahydrophthalic anhydride, and hexahydrophthalic anhydride. Examples of the alcohol having an unsaturated group include hydroxyethyl (meth)acrylate, hydroxypropyl (meth) acrylate, hydroxybutyl (meth)acrylate, pentaerythritol tri (meth)acrylate, and glycerin di(meth)acrylate.

As the unsaturated monobasic acid, preferably monocarboxylic acid, more preferably (meth)acrylic acid, even more preferably methacrylic acid is used.

These unsaturated monobasic acids may be used alone or in combination of two or more.

To obtain the vinyl ester, the epoxy resin and the unsaturated monobasic acid are reacted.

In the above-described reaction, an addition reaction of the epoxy group of the epoxy resin and the unsaturated monobasic acid occurs.

In the above-described reaction, an equivalent of the carboxyl group of the unsaturated monobasic acid with respect to the epoxy group of the epoxy resin is, for example, 0.8 or more, preferably 1.0 or more, and, for example, 1.5 or less, preferably 1.2 or less.

In the above-described reaction, as necessary, a catalyst can be added to the mixture.

Examples of the catalyst include the same catalysts listed as the catalysts of the above-described reaction of the phenol component and the epoxy component.

As the catalyst, preferably a quaternary ammonium salt, more preferably a triethylbenzylammonium chloride is used.

A mixing ratio of the catalyst to 100 parts by mass to the epoxy resin is, for example, 0.01 parts by mass or more, preferably 0.05 parts by mass or more, and, for example, 0.5 parts by mass or less, preferably 0.1 parts by mass or less.

In the above-described reaction, if necessary, a polymerization inhibitor (described later) (preferably, hydroquinone)) can be added thereto.

The mixing ratio of the polymerization inhibitor to 100 parts by mass of the epoxy resin is, for example, 0.01 parts by mass or more, preferably 0.05 parts by mass or more, and, for example, 0.5 parts by mass or less, preferably 0.1 parts by mass or less.

In the above-described reaction, the reaction temperature is, for example, 80° C. or more, preferably 100° C. or more, and, for example, 150° C. or less, preferably 130° C. or less. In the above-described reaction, the reaction time is, for example, 1 hour or more, preferably 2 hours or more, and, for example, 10 hours or less.

The above-described reaction can also be carried out subsequently to the above-described reaction of the phenol component and epoxy component.

In this manner, a vinyl ester is produced.

The acid value of the vinyl ester (measurement method: in conformity with JIS K6901 (2008)) is, for example, 1 mgKOH/g or more, and, for example, 20 mgKOH/g or less, preferably 10 mgKOH/g or less.

The mixing ratio of the vinyl ester to 100 parts by mass of the resin component is, for example, 5 parts by mass or more, and, for example, 20 parts by mass or less, preferably 15 parts by mass or less.

The mixing ratio of the vinyl ester to 100 parts by mass of the unsaturated polyester is, for example, 10 parts by mass or more, preferably 15 parts by mass or more, and, for example, 40 parts by mass or less, preferably 30 parts by mass or less.

The mixing ratio of the vinyl ester to 100 parts by mass of the polymerizable monomer is, for example, 5 parts by mass or more, preferably 10 parts by mass or more, and, for example, 40 parts by mass or less, preferably 30 parts by mass or less.

The resin component preferably contains a low profile agent.

The low profile agent is blended to suppress the cure shrinkage and thermal shrinkage of the molded article (described below) produced by using the unsaturated polyester resin composition.

Examples of the low profile agent include polyethylene, polystyrene, styrene thermoplastic elastomer, cross-linked polystyrene, polyvinyl acetate-polystyrene block copolymer, polyvinyl acetate, polymethylmethacrylate, and saturated polyester resin.

Polyethylene, polystyrene, polyvinyl acetate, and saturated polyester resin are preferable as the low profile agent.

The saturated polyester resin is produced by dissolving saturated polyester in the above-described polymerizable monomer.

The saturated polyester is a polymerization product of the above-described ethylenically unsaturated bond-free polybasic acid and the above-described polyhydric alcohol.

As the ethylenically unsaturated bond-free polybasic acid, preferably saturated aliphatic polybasic acid and aromatic polybasic acid, more preferably saturated aliphatic dibasic acid and aromatic dibasic acid, even more preferably adipic acid and isophthalic acid are used.

These ethylenically unsaturated bond-free polybasic acids can be used alone or in combination of two or more. As the ethylenically unsaturated bond-free polybasic acid, preferably adipic acid and isophthalic acid are used in combination.

As the polyhydric alcohol, preferably a dihydric alcohol, more preferably neopentyl glycol is used.

These polyhydric alcohols can be used alone or in combination of two or more.

The saturated polyester is obtained by polycondensation (condensation polymerization) of the ethylenically unsaturated bond-free polybasic acid and the polyhydric alcohol.

To carry out the polycondensation (condensation polymerization) of the ethylenically unsaturated bond-free polybasic acid and the polyhydric alcohol, the ethylenically unsaturated bond-free polybasic acid and the polyhydric alcohol are mixed in the following equivalent ratio.

The equivalent ratio (hydroxyl group of the polyhydric alcohol/carboxyl group of the ethylenically unsaturated bond-free polybasic acid) of the polyhydric alcohol to the ethylenically unsaturated bond-free polybasic acid is, for example, 0.9 or more, preferably 0.95 or more, and, for example, 1.2 or less, preferably 1.1 or less.

After mixing the ethylenically unsaturated bond-free polybasic acid and the polyhydric alcohol, the obtained mixture is stirred at a normal pressure under a nitrogen atmosphere to react the ethylenically unsaturated bond-free polybasic acid with the polyhydric alcohol. The reaction temperature is, for example, 150° C. or more, preferably 190° C. or more, and, for example, 250° C. or less, preferably 230° C. or less. The reaction time is, for example, 8 hours or more, and, for example, 30 hours or less.

In this manner, a saturated polyester is produced.

The acid value of the saturated polyester (measurement method: in conformity with JIS K6901 (2008)) is, for example, 5 mgKOH/g or more, and, for example, less than 40 mgKOH/g.

Then, the saturated polyester is dissolved in the above-described polymerizable monomer (preferably, styrene), and, as necessary, an additive (polymerization inhibitor (described later) (preferably, hydroquinone)) is added to prepare a saturated polyester resin.

In preparation of the saturated polyester resin, the mixing ratio of the polymerizable monomer to 100 parts by mass of the saturated polyester is, for example, 35 parts by mass or more, and, for example, 150 parts by mass or less. The mixing ratio of the polymerization inhibitor to 100 parts by mass of the saturated polyester is, for example, 0.001 parts by mass or more, preferably 0.005 parts by mass or more, and, for example, 0.1 parts by mass or less, preferably 0.05 parts by mass or less.

These low profile agents may be used alone or in combination of two or more. As the low profile agent, preferably, polyethylene and polystyrene are used in combination, and polyvinyl acetate and saturated polyester resin are used in combination, more preferably polyethylene and polystyrene are used in combination.

The mixing ratio of the low profile agent to 100 parts by mass of the total amount of the unsaturated polyester, vinyl ester, and polymerizable monomer is 5 parts by mass or more, preferably 10 parts by mass or more, and, for example, 30 parts by mass or less, preferably 20 parts by mass or less.

The aluminum hydroxide is blended to give flame retardancy, and give transparency and color depth to the molded article (described later) produced by using the unsaturated polyester resin composition.

The mixing ratio of the aluminum hydroxide to 100 parts by mass of the resin component is 50 parts by mass or more, preferably 100 parts by mass or more, and, 300 parts by mass or less, preferably 250 parts by mass or less, more preferably 200 parts by mass or less.

When the mixing ratio of the aluminum hydroxide is the above-described lower limit or more, the molded article (described later) produced by using the unsaturated polyester resin composition has excellent flame retardancy.

On the other hand, when the mixing ratio of the aluminum hydroxide is less than the above-described lower limit, the flame retardancy of the molded article (described later) produced by using the unsaturated polyester resin composition decreases.

When the mixing ratio of the aluminum hydroxide is the above-described upper limit or less, the molded article (described later) produced by using the unsaturated polyester resin composition has excellent mechanical properties.

On the other hand, when the mixing ratio of the aluminum hydroxide is more than the above-described upper limit, the mechanical properties of the molded article (described later) produced by using the unsaturated polyester resin composition decreases.

The average particle size of the aluminum hydroxide is, for example, 1 μm or more, and, for example, 50 μm or less, preferably 25 μm or less.

The average particle size of the aluminum hydroxide can be determined by creating a particle size distribution curve with a laser diffraction-scattering particle size distribution measurement device and calculating the particle size corresponding to 50% by mass.

The expandable graphite is a graphite intercalation compound produced by inserting, for example, sulfuric acid between the layers of scale-shaped natural graphite. The interlayers expand and are swollen at approximately 150 to 300° C. The expandable graphite of the present invention is the graphite intercalation compound before the heating.

A mixing ratio of the expandable graphite to 100 parts by mass of the resin component is, 3 parts by mass or more, preferably 5 parts by mass or more, and, 10 parts by mass or less, preferably 8 parts by mass or less.

When the mixing ratio of the expandable graphite is the above-described lower limit or more, the molded article (described later) produced by using the unsaturated polyester resin composition has excellent flame retardancy.

Specifically, the molded article (described later) satisfies the V-0 standard of UL 94 flame retardancy test (a thickness of 3 mm) described below, and the self-extinguishing time is less than one second in the flammability test described below.

On the other hand, when the mixing ratio of the expandable graphite is less than the above-described lower limit, the flame retardancy of the molded article (described later) produced by using the unsaturated polyester resin composition decreases.

When the mixing ratio of the expandable graphite is the above-described upper limit or less, the molded article (described later) produced by using the unsaturated polyester resin composition has excellent mechanical properties.

On the other hand, when the mixing ratio of the expandable graphite is more than the above-described upper limit, the mechanical properties of the molded article (described later) produced by using the unsaturated polyester resin composition decreases.

The average particle size of the expandable graphite is 150 μm or less, preferably 100 μm or less, and, for example, 10 μm or more, preferably 50 μm or more.

When the average particle size of the expandable graphite is the above-described upper limit or less, the expandable graphite is in a good dispersed state at the time when the reinforcing fiber (described later) is impregnated with the unsaturated polyester resin composition. Thus, the molded article (described later) produced by using the unsaturated polyester resin composition has excellent mechanical properties.

On the other hand, when the average particle size of the expandable graphite exceeds the above-described upper limit, the expandable graphite is localized at the time when the reinforcing fiber (described later) is impregnated with the unsaturated polyester resin composition. This reduces the mechanical properties (elastic modulus and strength) of the molded article (described later) produced by using the unsaturated polyester resin composition. Further, when the molding material is a sheet molding compound, the resin composition permeates the reinforcing fiber layer only from the surface of the reinforcing fiber layer due to the production constraints. This makes the increase in the localization of the expandable graphite on the surface more remarkable and the decrease in the mechanical properties (elastic modulus and strength) decrease more remarkable.

When the average particle size of the expandable graphite is the above-described lower limit or more, the molded article (described later) produced by using the unsaturated polyester resin composition has excellent flame retardancy.

The average particle size of the expandable graphite can be obtained by looking at the expandable graphite through an optical microscope and arbitrarily selecting 50 particles to measure the longest diameters (the long diameters) and the particle sizes (the short diameters) in a direction orthogonal to the longest diameter to calculate the average value of the long diameters and short diameters.

As the expandable graphite, GrafGuard 210-200N, 200-100N, or 210-140N manufactured by NEOGRAF, or 9510045 manufactured by Ito Graphite Co., Ltd can be used without any change. Alternatively, expandable graphite can be used by sifting the expandable graphite with a large average particle size to adjust the average particle size.

The unsaturated polyester resin composition is produced by mixing the resin component, the aluminum hydroxide, and the expandable graphite in the above-described mixing ratio.

Further, if necessary, an additive may be blended into the unsaturated polyester resin composition as long as it does not damage the effects of the present invention.

Examples of the additive include wetting and dispersing agents, polymerization inhibitors, curing agents, release agents, coloring agents, flame retardants, fillers, thickening agents, pattern materials, antibacterial agents, hydrophilic agents, photocatalysts, ultraviolet absorbers, ultraviolet stabilizers, separation inhibitors, silane coupling agents, antistatic agents, thixotropic agents, thixo stabilizers, and polymerization accelerators.

These additives may be used alone or in combination of two or more.

The wetting and dispersing agent is generally be blended to optimize the viscosity of the unsaturated polyester resin composition.

Examples of the wetting and dispersing agent include a copolymer having an acid group, phosphoric acid polyester, and an alkylammonium salt. A copolymer having an acid group and an alkylammonium salt are preferable.

As the copolymer having an acid group, a wetting and dispersing agent, BYK-W995, BYK-W996, or BYK-W9010 (manufactured by BYK-Chemie) can be used.

Examples of the alkylammonium salt include an alkylammonium salt of a high-molecular weight copolymer. Specifically, for example, BYK-W9076 with an amine value of 44 mg/KOH/g and an acid value of 38 mg/KOH/g manufactured by BYK-CHEMIE can be used.

When an alkylammonium salt is used as the wetting and dispersing agent, the mechanical properties of the molded article (described later) produced by using the unsaturated polyester resin composition is improved.

These wetting and dispersing agents can be used alone or in combination of two or more. As the wetting and dispersing agent, preferably, a copolymer having an acid group and an alkylammonium salt can be used in combination.

The mixing ratio of the wetting and dispersing agent to 100 parts by mass of the resin component is, for example, 0.1 parts by mass or more, preferably 0.3 parts by mass or more, more preferably 1 part by mass or more, and, for example, 5 parts by mass or less, preferably 2 parts by mass or less.

The polymerization inhibitor is blended in order to adjust the pot life and the curing reaction.

Examples of the polymerization inhibitor include hydroquinone compounds, benzoquinone compounds, catechol compounds, phenol compounds, and N-oxyl compounds. Examples of the hydroquinone compounds include hydroquinone, methylhydroquinone, and t-butylhydroquinone. Examples of the benzoquinone compounds include p-benzoquinone and methyl-p-benzoquinone. Examples of the catechol compounds include t-butylcatechol. Examples of the phenol compounds include 2,6-di-t-butyl-4-methylphenol and 4-methoxyphenol. Examples of the N-oxyl compounds include 1-oxyl-2,2,6,6-tetramethylpiperidine, 1-oxyl-2,2,6,6-tetramethylpiperidine-4-ol, 4-hydroxy-2,2,6,6-tetrapiperidine-1-oxyl, 4-methoxy-2,2,6,6-tetramethylpiperidine-1-oxyl, 1-oxyl-2,2,6,6-tetramethylpiperidine-4-yl-acetate, 1-oxyl-2,2,6,6-tetramethylpiperidine-4-yl-2-ethylhexanoate, 1-oxyl-2,2,6,6-tetramethylpiperidine-4-yl-stearate, 1-oxyl-2,2,6,6-tetramethylpiperidine-4-yl-4-t-butylbenzoate, bis(1-oxyl-2,2,6,6-tetramethylpiperidine-4-yl) succinate ester, bis(1-oxyl-2,2,6,6-tetramethylpiperidine-4-yl) adipic acid ester, bis(1-oxyl-2,2,6,6-tetramethylpiperidine-4-yl) sebacate, bis(1-oxyl-2,2,6,6-tetramethylpiperidine-4-yl) n-butylmalonic acid ester, bis(1-oxyl-2,2,6,6-tetramethylpiperidine-4-yl) phthalate, bis(1-oxyl-2,2,6,6-tetramethylpiperidine-4-yl) isophthalate, bis(1-oxyl-2,2,6,6-tetramethylpiperidine-4-yl) terephthalate, bis (1-oxyl-2,2,6,6-tetramethylpiperidine-4-yl) hexahydroterephthalate, N,N'-bis(1-oxyl-2,2,6,6-tetramethylpiperidine-4-yl) adipamide, N-bis(1-oxyl-2,2,6,6-tetramethylpiperidine-4-yl) caprolactam, N-bis(1-oxyl-2,2,6,6-tetramethylpiperidine-4-yl) dodecylsuccinimide, 2,4,6-tris-[N-butyl-N-(1-oxyl-2,2,6,6-tetramethylpiperidine-4-yl)]-s-triazine, and 1-oxyl-2,2,6,6-tetramethylpiperidine-4-one.

As the polymerization inhibitor, preferably a benzoquinone compound, more preferably a p-benzoquinone is used.

These polymerization inhibitors can be used alone or in combination of two or more.

The mixing ratio of the polymerization inhibitor to 100 parts by mass of the resin component is, for example, 0.01 parts by mass or more, and, for example, 0.1 parts by mass or less.

Examples of the curing agent include peroxides. Examples of the peroxides include benzoyl peroxide, t-butyl peroxyisopropyl monocarbonate, t-amyl peroxyisopropyl monocarbonate, t-hexyl peroxyisopropyl monocarbonate, 1,1-bis(t-butyl peroxy)cyclohexane, t-butyl peroxy-2-ethylhexanoate, amylperoxy-2-ethylhexanoate, 2-ethylhexylperoxy-2-ethylhexanoate, t-butyl peroxybenzoate, t-hexyl peroxybenzoate, and t-hexyl peroxyacetate.

These curing agents may be used alone or in combination of two or more.

The mixing ratio of the curing agent to 100 parts by mass of the resin component is, for example, 0.1 parts by mass or more, preferably 0.5 parts by mass or more, and, for example, 5 parts by mass or less, preferably 1 part by mass or less.

Examples of the release agent include fatty acids, fatty acid metal salts, paraffins, liquid waxes, fluorine polymers, and silicon-based polymers. Examples of the fatty acids include stearic acid and lauric acid. Examples of the fatty acid metal salts include zinc stearate and calcium stearate.

As the release agents, preferably a fatty acid metal salt, more preferably zinc stearate is used.

These release agents can be used alone or in combination of two or more.

The mixing ratio of the release agent to 100 parts by mass of the resin component is, for example, 1 part by mass or more, preferably 3 parts by mass or more, and, for example, 10 parts by mass or less.

The coloring agent is not especially limited. A variety of coloring agents, which have conventionally been used for thermosetting resins such as unsaturated polyester resin, acrylic resin, and vinyl ester resin, can be used as the coloring agent. Examples of the coloring agent for the unsaturated polyester resin include polyester toner produced by mixing known pigments such as titanium oxide, carbon black, bengara, and phthalocyanine blue.

As the coloring agent, preferably, polyester toner is used.

These coloring agents can be used alone or in combination of two or more.

The mixing ratio of the coloring agent to 100 parts by mass of the resin component is, for example, 1 part by mass or more, preferably 5 parts by mass or more, and, for example, 20 parts by mass or less.

A flame retardant is mixed with the molded article (described later) produced by using the unsaturated polyester resin composition to give flame retardancy thereto.

Examples of the flame retardant include halogen flame retardants and non-halogen flame retardants. Examples of the halogen flame retardant include a bromine-based flame retardant. Examples of the non-halogen flame retardants include a phosphorus-based flame retardant, an inorganic flame retardant, and a nitrogen compound-based flame retardant.

Preferably a non-halogen flame retardant, more preferably a phosphorus-based flame retardant is used as the flame retardant.

The mixing ratio of the flame retardant to 100 parts by mass of the resin component is, for example, 1 part by mass or more, preferably 5 parts by mass or more, and, for example, 50 parts by mass or less, preferably 20 parts by mass or less.

Examples of the filler include inorganic fillers (excluding aluminum hydroxide).

Examples of the inorganic fillers include oxides, hydroxides (excluding aluminum hydroxide), carbonates, sulfates, silica, glass powders, hollow fillers, silicates, fluorides, phosphates, and clay minerals. Examples of the oxides include alumina and titania. Examples of the hydroxides include magnesium hydroxide. Examples of the carbonates include calcium carbonate. Examples of the sulfates include barium sulfate. Examples of the silica include crystalline silica, fused silica, fumed silica, and dry silica (aerogel). Examples of the hollow fillers include glass balloon, silica balloon, and alumina balloon. Examples of the silicates include silica sand, diatomaceous earth, mica, clay, kaolin, and talc. Examples of the fluorides include fluorite. Examples of the phosphates include calcium phosphate. Examples of the clay minerals include smectite.

These fillers can be used alone or in combination of two or more.

The mixing ratio of the filler to 100 parts by mass of the resin component is, for example, 1 part by mass or more, preferably 3 parts by mass or more, and, for example, 50 parts by mass or less, preferably 30 parts by mass or less.

A thickener is blended so as to increase the viscosity of the unsaturated polyester resin composition to a suitable value for heat compression molding. The thickener is preferably blended before (preferably, immediately before) impregnating the unsaturated polyester resin composition into the reinforcing fiber (described later).

Examples of the thickener include alkaline earth metal oxides and alkaline earth metal hydroxides. Examples of the alkaline earth metal oxides include magnesium oxide. Examples of the alkaline earth metal hydroxides include magnesium hydroxide and calcium hydroxide.

As the thickening agent, preferably alkaline earth metal oxide, more preferably magnesium oxide is used.

These thickening agents can be used alone or in combination of two or more.

The mixing ratio of the thickening agent to 100 parts by mass of the resin component is, for example, 0.5 parts by mass or more, and, for example, 10 parts by mass or less, preferably 3 parts by mass or less.

The unsaturated polyester can be prepared as an unsaturated polyester resin by dissolving the unsaturated polyester in a polymerizable monomer in advance.

In the preparation of the unsaturated polyester resin, as necessary, the above-described additives (for example, the polymerization inhibitor) can appropriately be mixed therewith together with the blending of the unsaturated polyester and the polymerizable monomer.

In the preparation of the unsaturated polyester resin, the mixing ratio of the polymerizable monomer to 100 parts by mass of the unsaturated polyester is, for example, 35 parts by mass or more, and, for example, 150 parts by mass or less. The mixing ratio of the polymerization inhibitor to 100 parts by mass of the unsaturated polyester is, for example, 0.001 parts by mass or more, preferably 0.005 parts by mass or more, and, for example, 0.1 parts by mass or less, preferably 0.05 parts by mass or less.

The vinyl ester can be prepared as a vinyl ester resin by dissolving the vinyl ester in a polymerizable monomer in advance.

In the preparation of the vinyl ester resin, as necessary, the above-described additives can be mixed therewith together with the blending of the vinyl ester and the polymerizable monomer.

In preparation of the vinyl ester resin, the mixing ratio of the polymerizable monomer to 100 parts by mass of the vinyl ester is, for example, 35 parts by mass or more, and, for example, 150 parts by mass or less.

In the unsaturated polyester resin composition produced as described above, the aluminum hydroxide is contained in a predetermined ratio to the resin component. Further, the expandable graphite is contained in a predetermined ratio to the resin component. The expandable graphite has a predetermined average particle size. Thus, the molded article (described later) produced by using the unsaturated polyester resin composition has excellent flame retardancy and mechanical properties. Specifically, the molded article (described later) satisfies the V-0 standard of UL 94 flame retardancy test (a thickness of 3 mm) described below, and the self-extinguishing time is less than one second in the flammability test described below. There is no reduction in the mechanical properties (elastic modulus and strength) caused by the addition of the expandable graphite.

Then, the reinforcing fiber is blended to the unsaturated polyester resin composition described above, thereby preparing the molding material. Further, a molded article can be made of the molding material described above by a known method.

Examples of the reinforcing fiber include inorganic fibers, organic fibers and natural fibers. Examples of the inorganic fibers include glass fiber, carbon fiber, metal fiber, and ceramics fiber. Examples of the organic fibers include polyvinyl alcohol fiber, polyester fiber, polyamide fiber, fluorine resin fiber, and phenol fiber. Examples of the natural fibers include hemp and Kenaf.

As the reinforcing fiber, preferably inorganic fiber, more preferably glass fiber is used.

Examples of the form of these examples of the reinforcing include cloth, mat, strand, roved, nonwoven fabric, and paper. Examples of the form of cloth include roving cloth. Examples of the form of mat include chopped strand mat, preformable mat, continuous strand mat, and surfacing mat. Examples of the form of strand include chopped strand.

As the form of the reinforcing fiber, preferably a mat form, more preferably a chopped strand form is used.

The length of the reinforcing fiber is not particularly limited. The length of the reinforcing fiber is, for example, 0.1 mm or more, preferably 1.5 mm or more, more preferably 5 mm or more, even more preferably 15 mm or more, and, for example, 80 mm or less, preferably 40 mm or less.

The mixing ratio of the reinforcing fiber (hereinafter referred to as the glass content ratio, for example, when the reinforcing fiber is glass fiber) to the total amount of the unsaturated polyester resin composition and reinforcing fiber is, for example, 5 mass % or more, preferably 10 mass % or more, more preferably 20 mass % or more, and, for example, 50 mass % or less, preferably 40 mass % or less.

Examples of the molding material include a molding material produced by a known method, and include a sheet molding compound (SMC), a thick molding compound (TMC), and a bulk molding compound (BMC).

Further, compared to a bulk molding compound (BMC), the sheet molding compound (SMC) has high reinforcing fiber content and a high degree of freedom in reinforcing fiber length, and the damage to the reinforcing fiber is reduced in the production steps. Thus, a sheet molding compound is used for purposes requiring particularly excellent mechanical properties. Therefore, a sheet molding compound is more preferable.

In this manner, the molding material containing the above-described unsaturated polyester resin composition and reinforcing fiber is produced.

Relative to the molding material, the total amount (volume content rate) of the filler-excluding component is, for example, 40 vol % or more, preferably 45 vol % or more, and, for example, 70 vol % or less, preferably 60 vol % or less.

The filler-excluding component is the total amount of the components excluding the aluminum hydroxide, the expandable graphite, and the filler that is added as necessary in the above-described unsaturated polyester resin composition. In other words, the filler-excluding component is the total amount of the resin component, the wetting and dispersing agent that is added as necessary, and the additives other than the filler that are added as necessary.

Relative to the molding material, the volume content rate of the expandable graphite (calculated based on a density of 1.8 g/ml) is, for example, 1 vol % or more, and, for example, 5 vol % or less, preferably 3 vol % or less (1% by weight or more, and, for example, 5% by weight or less, preferably 3% by weight or less on the weight basis).

Relative to the molding material, the volume content rate of the reinforcing fiber is, for example, 15 vol % or more, preferably 20 vol % or more, and, for example, 40 vol % or less, preferably 35 vol % or less.

The molding material contains the above-described unsaturated polyester resin composition. Thus, the molded article produced by using the molding material has excellent flame retardancy and mechanical properties.

Next, the molding material described above is aged to increase the viscosity of the molding material so that the molding material is ready for heat compression molding (described later).

In the aging of the molding material, the aging temperature is, for example, 20° C. or more, and, for example, 50° C. or less. The aging time is, for example, 8 hours or more, and, for example, 120 hours or less.

In this manner, the molding material is maintained, for example, in the form of a sheet. In other words, the molding material has a sheet shape.

The molded article is produced by heat compression molding of the molding material by a known method.

The conditions of the heat compression molding are appropriately set depending on the purpose and use. In the heat compression molding, the molding temperature is, for example, 100° C. or more, and, for example, 200° C. or less. The molding pressure is, for example, 0.1 MPa or more, preferably 1 MPa or more, more preferably 5 MPa or more, and, for example, 20 MPa or less, preferably 15 MPa or less.

In this manner, the molding material is formed and cured, thereby producing the molded article.

The molded article contains a cured product of the above-described molding material, and thus has excellent flame retardancy and mechanical properties.

The molded article can widely be used for building materials, housings, casting materials, machine components (such as battery cases for electric vehicles), electronic or electric components, and various components of vehicles, ships, and airplanes.

In particular, battery cases for electric vehicles may require excellent flame retardancy to retard the fire spread of a vehicle fire, and may require excellent mechanical properties to prevent the damage to the battery due to a collision.

The molded article has excellent flame retardancy and mechanical strength, and thus can suitably be used for battery cases for electric vehicles.

EXAMPLES

The specific numeral values used in the description below, such as mixing ratios (contents), physical property values, and parameters can be replaced with the corresponding mixing ratios (contents), physical property values, and parameters in the above-described "DESCRIPTION OF THE EMBODIMENTS", including the upper limit values (numeral values defined with "or less", and "less than") or the lower limit values (numeral values defined with "or more", and "more than"). The "parts" and "%" are based on mass unless otherwise specified.

1. Details of Components

Expandable graphite A (an average particle size of 70 μm): The trade name "9510045" manufactured by Ito Graphite Co., Ltd was used without any change (25% on 100 mesh). Expandable graphite B (an average particle size of 150 μm): The trade name "9280170" manufactured by Ito Graphite Co., Ltd passed though 80 mesh and was used (45% on 100 mesh). Expandable graphite C (an average particle size of 250 μm): The trade name "9280170" manufactured by Ito Graphite Co., Ltd was used without any change (95% on 100 mesh). Expandable graphite D (an average particle size of 350 μm): The trade name "GREP-EG" manufactured by SUZUHIRO CHEMICAL CO., LTD. was used without any change (99% on 100 mesh).

OP 1230: flame retardant, a phosphinic acid metal salt, trade name "Exolit OP1230" manufactured by Clariant Chemicals.

2. Preparation of Unsaturated Polyester Resin

Synthesis Example 1

A flask equipped with a thermometer, a nitrogen introducing tube, a reflux tube, and a stirrer was charged with 10.0 mol of maleic anhydride, 6.5 mol of propylene glycol, and 4.0 mol of neopentyl glycol. Thereafter, the mixture was subjected to polycondensation reaction at 200° C. to 210° C. while being stirred under nitrogen gas atmosphere. In this manner, an unsaturated polyester with an acid value of 26.5 mgKOH/g was produced. The acid value was measured by a method in accordance with JIS K6901 (2008). Relative to 100 parts by mass of the produced unsaturated polyester, 0.01 parts by mass of hydroquinone as a polymerization inhibitor and 66.7 parts by mass of styrene were added, and the mixture was stirred homogenously. In this manner, an unsaturated polyester resin (styrene content 40%) was produced.

Synthesis Example 2

A flask equipped with a thermometer, a nitrogen introducing tube, a reflux tube, and a stirrer was charged with 3.3 mol of isophthalic acid and 10.5 mol of pentyl glycol. Thereafter, the mixture was subjected to polycondensation reaction at 200° C. to 210° C. while being stirred under nitrogen gas atmosphere. Thereafter, when the acid value of the reaction product reached 20 mgKOH/g, the reaction product was cooled to 150° C. Next, 6.7 mol of maleic anhydride was charged, and the mixture was allowed to react again at 210° C. to 220° C. An unsaturated polyester with an acid value of 27.5 mgKOH/g was produced. Relative to 100 parts by mass of the produced unsaturated polyester, 0.01 parts by mass of hydroquinone as a polymerization inhibitor and 66.7 parts by mass of styrene were added, and the mixture was stirred homogenously. In this manner, an unsaturated polyester resin (styrene content 40%) was produced.

3. Preparation of Saturated Polyester Resin

Synthesis Example 3

A flask equipped with a thermometer, a nitrogen introducing tube, a reflux tube, and a stirrer was charged with 4.0 mol of isophthalic acid and 10.5 mol of neopentyl glycol. Thereafter, the mixture was subjected to polycondensation reaction at 200° C. to 210° C. while being stirred under nitrogen gas atmosphere. Thereafter, when the acid value of the reaction product reached 10 mgKOH/g, the reaction product was cooled to 150° C. Next, 6.0 mol of adipic acid was charged, and the mixture was allowed to react again at 210° C. to 220° C. In this manner, a saturated polyester with an acid value of 9.5 mgKOH/g was produced. Relative to 100 parts by mass of the produced saturated polyester, 0.01 parts by mass of hydroquinone as a polymerization inhibitor and 66.7 parts by mass of styrene were added, and the mixture was stirred homogenously. In this manner, a saturated polyester resin (styrene content 40%) was produced.

4. Preparation of Vinyl Ester Resin

Synthesis Example 4

A flask equipped with a stirrer, a reflux tube, and a gas introducing tube was charged with 1850 parts by mass of a bisphenol A epoxy compound (epoxy equivalent of 185 g/eq) (10.0 equivalents), 317 parts by mass of bisphenol A (2.78 equivalent), and 0.5 parts by mass of triethylbenzylammonium chloride as a catalyst. Next, the mixture was allowed to react at 170° C. for 5 hours while nitrogen was introduced. In this manner, an epoxy resin with an epoxy equivalent of 298 g/eq was produced. After the mixture was cooled to 120° C., 2.0 parts by mass of hydroquinone as a polymerization inhibitor, 2.0 parts by mass of triethylbenzylammonium chloride as a catalyst, and 636 parts by mass of methacrylic acid (7.40 equivalents) were added. Next, the mixture was allowed to react at 110° C. for 8 hours while the air was introduced. In this manner, a vinyl ester with an acid value of 8.0 mgKOH/g was produced. Next, 1869 parts by mass of styrene (66.7 parts by mass to 100 parts by mass of the vinyl ester) was added to the produced vinyl ester. In this manner, a vinyl ester resin (styrene content of 40% by mass) was produced.

5. Preparation of Unsaturated Polyester Resin Composition and Molding Material

Example 1

The following components were added in the order in which they appear and mixed. In this manner, an unsaturated polyester resin composition was produced.

Unsaturated polyester resin: 60 parts by mass of the unsaturated polyester resin of Synthesis Example 1 (36 parts by mass of unsaturated polyester, 24 parts by mass of styrene)

Vinyl ester resin: 10 parts by mass of the vinyl ester resin of Synthesis Example 4 (6 parts by mass of vinyl ester, 4 parts by mass of styrene)

Polymerizable monomer: 10 parts by mass of styrene

Low profile agent: 15 parts by mass of a polystyrene solution (a styrene solution of polystyrene (a weight average molecular weight of about 200000) (styrene content of 65%)), and 5 parts by mass of polyethylene powder Polymerization inhibitor: 0.05 parts by mass of p-benzoquinone Curing agent: 1 part by mass of t-butyl peroxyisopropyl carbonate Wetting and dispersing agent: 1.0 part by mass of a copolymer having an acid group and 0.5 parts by mass of an alkylammonium salt of a high-molecular weight polymer Expandable graphite: 7 parts by mass of the expandable graphite A Coloring agent: 10 parts by mass of black polyester toner (obtained by dispersing carbon black in polyester resin)

Release agent: 5 parts by mass of zinc stearate

Aluminum hydroxide: 150 parts by mass of aluminum hydroxide (an average particle size of 8 μm)

Thickening agent: 0.8 parts by mass of magnesium oxide

Next, glass roving was continuously cut into 25-mm pieces on the unsaturated polyester resin composition applied on a carrier film using a known sheet molding compound (SMC) impregnation device and a doctor blade and added to the unsaturated polyester resin composition so that the glass fiber content became 35 mass % (25.5 vol %). Subsequently, an impregnating step was carried out. Thereby, a molding material (sheet molding compound (SMC)) was produced. Next, the produced molding material is aged at 40° C. for 48 hours to increase the viscosity of the molding material until the molding material was ready for heat compression molding.

Examples 2 to 12 and Comparative Examples 1 to 8

The same process as Example 1 was carried out, thereby producing molding materials.

The formulations were, however, changed according to Tables 1 to 4.

In Example 6 and Example 11, the saturated polyester resin of Synthesis Example 3 and a polyvinyl acetate solution (styrene solution of polyvinyl acetate (styrene content of 65%)) were used, respectively, as the low profile agent.

In Example 12, a phosphinic acid metal salt (OP 1230 (trade name, Exolit OP 1230, manufactured by Clariant Chemicals, phosphorus content of 23%)) was used as the flame retardant.

Example 13

The following components were added in the order in which they appear and mixed.

Unsaturated polyester resin: 60 parts by mass of the unsaturated polyester resin of Synthesis Example 1 (36 parts by mass of unsaturated polyester, 24 parts by mass of styrene)

Vinyl ester resin: 10 parts by mass of the vinyl ester resin of Synthesis Example 4 (6 parts by mass of vinyl ester, 4 parts by mass of styrene)

Polymerizable monomer: 10 parts by mass of styrene

Low profile agent: 15 parts by mass of a polystyrene solution (a 65% styrene solution of polystyrene with a weight average molecular weight of approximately 200000), and 5 parts by mass of polyethylene powder Polymerization inhibitor: 0.05 parts by mass of p-benzoquinone Curing agent: 1 part by mass of t-butyl peroxyisopropyl monocarbonate Wetting and dispersing agent: 1.0 part by mass of a copolymer having an acid group and 0.5 parts by mass of an alkylammonium salt of a high-molecular weight polymer Expandable graphite: 7 parts by mass of Expandable graphite A Coloring agent: 10 parts by mass of black polyester toner (produced by dispersing carbon black in polyester resin)

Release agent: 5 parts by mass of zinc stearate

Aluminum hydroxide: 180 parts by mass of aluminum hydroxide (an average particle size of 8 μm)

Next, 0.8 parts by mass of magnesium oxide and 119 parts by mass of chopped glass produced by cutting glass fiber into 6 mm pieces (28% in the molding material) were put in a kneading machine (kneader) and kneaded, thereby producing a bulk molding compound (BMC) as an unsaturated polyester resin composition.

Comparative Examples 9 and 10

The same process as Example 13 was carried out to produce molding materials.

The formulations were, however, changed according to Table 4.

6. Evaluation (Production of Molded Board)

The molding material of each of Examples and Comparative Examples was subjected to heat compression molding using a 300 mm×300 mm flat metal plate, thereby producing board-shaped molded articles with a thickness of 4 mm, a thickness of 3 mm, a thickness of 2.5 mm, and a thickness of 2 mm, respectively.

The molding was carried out under the conditions of a mold temperature on the product side and the reverse side of 140° C., a mold pressure of 10 MPa, and a retaining time inside the mold of 300 seconds. Thereafter, the molded article was demolded from the mold and immediately held between the iron plates and cooled. In this manner, the board-shaped molded articles were produced.

(Molding Compression Rate)

The board-shaped molded article (a thickness of 4 mm) was allowed to stand at 25° C. for 24 hours, and the four sides of the molded article at 25° C. were measured, and the compression rate was measured by the ratio to the size of the above-described flat plate mold. The results are shown in Table 5 or 6.

(Flame Retardancy)

Test pieces were cut out from the flat-plate molded articles (a thickness of 3 mm, a thickness of 2.5 mm, and a thickness of 2.0 mm), respectively, and processed, and a flammability test in accordance with UL94 standard (flammability of plastic materials) of UL standard (Underwriters Laboratories Inc.) was carried out. In detail, each of the test pieces with a thickness of 3 mm, a thickness of 2.5 mm, and a thickness of 2.0 mm was evaluated if it satisfied the V-0 standard.

The flame retardancy was evaluated based on the following criteria. The results are shown in Table 5 or 6.
Evaluation criteria:
Excellent: conformable to V-0 standard (thickness 2.0 mm).
Good: conformable to V-0 standard (thickness 2.5 mm) and not not conformable to V-0 standard (thickness 2.0 mm)
Fair: conformable to V-0 standard (thickness 3 mm) and not not conformable to V-0 standard (thickness 2.5 mm)
Bad: not conformable to V-0 standard (thickness 3 mm).

(Flammability Test)

A test piece (150 mm×150 mm) was cut out from each of the flat-plate molded articles (a thickness of 3 mm). Next, a commercially available cooking torch (culinary torch CJ2 manufactured by Iwatani Corporation) was used and adjusted so that the length of the inner cone of the flame of the torch was approximately 50 mm, and the temperature of the tip of the inner cone was approximately 1000° C. Further, the central part of the 150 mm×150 mm molded plate with a plate thickness of 3 mm was fixed to a position vertically 40 mm away from the tip of the torch. Then, the torch was ignited and stopped 2 minutes later. The time until the flame was extinguished was observed.

The extinguishing time after the combustion was evaluated based on the following criteria. The results are shown in Table 5 or 6.
Evaluation criteria:
Good: The extinguishing time was less than 5 seconds.
Bad: The extinguishing time was more than 5 seconds.
(Production Stability)
<Evaluations of Impregnation>

The carrier film was peeled off with a utility knife immediately after the production of the SMC. The degree of the impregnation of the glass fiber with the unsaturated polyester resin composition was visually evaluated.

The impregnation was evaluated based on the following criteria. The results are shown in Table 5 or 6.
Evaluation criteria:
Good: The glass fiber was sufficiently impregnated with the unsaturated polyester resin composition, and glass fiber that was not impregnated with the unsaturated polyester resin composition was not observed.
Bad: Glass fiber that was partially not impregnated with the unsaturated polyester resin composition was observed.

(Density)

A test piece was cut out from each of the flat plate molded articles (a thickness of 4 mm), and the density was measured in accordance with JIS K6911 (1995). The results are shown in Table 5 or 6.

(Flexural Properties)

A test piece (a length of 80 mm and a width of 10 mm) was cut out from each of the flat-plate molded articles (a thickness of 4 mm). Next, the flexure strength and flexural modulus of elasticity at 23° C. were measured in accordance with JIS K7017 (1999). The results are shown in Table 5 or 6.

(Tensile Properties)

A test piece was cut out from each of the flat-plate molded articles (a thickness of 3 mm). Next, the tensile strength and tensile modulus of elasticity at 23° C. were measured in accordance with JIS K7164 (2005). The results are shown in Table 5 or 6.

(Impact Properties)

A test piece was cut out from each of the flat-plate molded articles (a thickness of 4 mm). Next, Izod impact strength of the test piece unnotched and impacted in a flatwise direction at 23° C. was measured in accordance with JIS K7110 (1999). The results are shown in Table 5 or 6.

TABLE 1

|  |  |  |  | Unit | Ex. 1 | Ex. 2 | Ex. 3 | Ex. 4 | Ex. 5 | Ex. 6 | Ex. 7 |
|---|---|---|---|---|---|---|---|---|---|---|---|
| Unstaurated polyester resin composition | Resin component | Unsaturated polyester resin | Unsaturated polyester resin of Synthesis Example 1 | Parts by mass | 60 | 60 | — | 60 | 70 | 50 | 85 |
| | | | Unsaturated polyester resin of Synthesis Example 2 | Parts by mass | — | — | 60 | — | — | — | — |
| | | | Vinyl ester resin of Synthesis Example 4 | Parts by mass | 10 | 10 | 10 | 10 | — | 10 | 15 |
| | | | Styrene | Parts by mass | 10 | 10 | 10 | 10 | 10 | 5 | — |
| | | | Polyvinyl acetate solution | Parts by mass | — | — | — | — | — | 15 | — |
| | | | Saturated polyester resin of Synthesis Example 3 | Parts by mass | — | — | — | — | — | 20 | — |
| | | | Polystyrene solution | Parts by mass | 15 | 15 | 15 | 15 | 15 | — | — |
| | | | polyethylene powder | Parts by mass | 5 | 5 | 5 | 5 | 5 | — | — |
| | Aluminum hydroxide | | | Parts by mass | 150 | 150 | 150 | 150 | 150 | 150 | 150 |
| | Calcium carbonate | | | Parts by mass | — | — | — | — | — | — | — |
| | Expandable graphite | Expandable graphite A | | Parts by mass | 7 | 7 | 7 | — | 7 | 7 | 7 |
| | | Expandable graphite B | | Parts by mass | — | — | — | 7 | — | — | — |
| | | Expandable graphite C | | Parts by mass | — | — | — | — | — | — | — |
| | | Expandable graphite D | | Parts by mass | — | — | — | — | — | — | — |
| | Flane retardant | OP 1230 (phosphorus-based flame retardant) | | Parts by mass | — | — | — | — | — | — | — |
| | Polymerization inhibitor | p-benzoquinone | | Parts by mass | 0.05 | 0.05 | 0.05 | 0.05 | 0.05 | 0.05 | 0.05 |
| | Curing agent | t-butyl peroxyisopropyl carbonate | | Parts by mass | 1 | 1 | 1 | 1 | 1 | 1 | 1 |
| | Release agent | Zinc stearate | | Parts by mass | 5 | 5 | 5 | 5 | 5 | 5 | 5 |
| | Coloring agent | Black polyester toner | | Parts by mass | 10 | 10 | 10 | 10 | 10 | 10 | 10 |
| | Wetting and dispersing agent | Copolymer having acid group | | Parts by mass | 1.0 | 1.0 | 1.0 | 1.0 | 1.0 | 1.0 | 1.0 |
| | | Alkylammonium salt of high-molecular weight polymer | | Parts by mass | 0.5 | — | 0.5 | 0.5 | 0.5 | 0.5 | 0.5 |
| | Thickening agent | Magnesium oxide | | Parts by mass | 0.8 | 0.8 | 0.8 | 0.8 | 0.8 | 0.8 | 0.8 |
| Reinforcing fiber | | Glass fiber (fiber length (25 mm)) | | % | 35.0 | 35.0 | 35.0 | 35.0 | 35.0 | 35.0 | 36.0 |
| | | Glass fiber (fiber length (6 mm)) | | % | — | — | — | — | — | — | — |
| Content by weight in molding material | | Aluminum hydroxide | | % | 35.4% | 35.5% | 35.4% | 35.4% | 35.4% | 35.4% | 34.9% |
| | | Expandable graphite | | % | 1.7% | 1.7% | 1.7% | 1.7% | 1.7% | 1.7% | 1.6% |
| Content by volume in molding material | | Filler-excluding component | | vol % | 45.7% | 45.7% | 45.7% | 45.7% | 45.7% | 45.4% | 46.3% |
| | | Aluminum hydroxide | | vol % | 27.1% | 27.1% | 27.1% | 27.1% | 27.1% | 27.2% | 26.2% |
| | | Calcium carbonate | | vol % | — | — | — | — | — | — | — |
| | | Expandable graphite | | vol % | 1.7% | 1.7% | 1.7% | 1.7% | 1.7% | 1.7% | 1.6% |
| | | Reinforcing fiber | | vol % | 25.5% | 25.5% | 25.5% | 25.5% | 25.5% | 25.6% | 25.8% |

TABLE 2

|  |  |  |  | Unit | Ex. 8 | Ex. 9 | Ex. 10 | Ex. 11 | Ex. 12 | Ex. 13 |
|---|---|---|---|---|---|---|---|---|---|---|
| Unstaurated polyester resin composition | Resin component | Unsaturated polyester resin | Unsaturated polyester resin of Synthesis Example 1 | Parts by mass | 60 | 85 | 60 | 50 | 60 | 60 |
| | | | Unsaturated polyester resin of Synthesis Example 2 | Parts by mass | — | — | — | — | — | — |
| | | | Vinyl ester resin of Synthesis Example 4 | Parts by mass | 10 | 15 | 10 | 10 | 10 | 10 |
| | | | Styrene | Parts by mass | 10 | — | 10 | 5 | 10 | 10 |
| | | | Polyvinyl acetate solution | Parts by mass | — | — | — | 15 | — | — |
| | | | Saturated polyester resin of Synthesis Example 3 | Parts by mass | — | — | — | 20 | — | — |
| | | | Polystyrene solution | Parts by mass | 15 | — | 15 | — | 15 | 15 |
| | | | polyethylene powder | Parts by mass | 5 | — | 5 | — | 5 | 5 |
| | Aluminum hydroxide | | | Parts by mass | 70 | 50 | 150 | 250 | 250 | 180 |
| | Calcium carbonate | | | Parts by mass | — | — | — | — | — | — |
| | Expandable graphite | Expandable graphite A | | Parts by mass | 10 | 10 | 7 | 5 | 3 | 7 |
| | | Expandable graphite B | | Parts by mass | — | — | — | — | — | — |
| | | Expandable graphite C | | Parts by mass | — | — | — | — | — | — |
| | | Expandable graphite D | | Parts by mass | — | — | — | — | — | — |
| | Flane retardant | OP 1230 (phosphorus-based flame retardant) | | Parts by mass | — | — | — | — | 15 | — |

TABLE 2-continued

|  |  |  | Unit | Ex. 8 | Ex. 9 | Ex. 10 | Ex. 11 | Ex. 12 | Ex. 13 |
|---|---|---|---|---|---|---|---|---|---|
|  | Polymerization inhibitor | p-benzoquinone | Parts by mass | 0.05 | 0.05 | 0.05 | 0.05 | 0.05 | 0.05 |
|  | Curing agent | t-butyl peroxyisopropyl carbonate | Parts by mass | 1 | 1 | 1 | 1 | 1 | 1 |
|  | Release agent | Zinc stearate | Parts by mass | 5 | 5 | 5 | 5 | 5 | 5 |
|  | Coloring agent | Black polyester toner | Parts by mass | 10 | 10 | 10 | 10 | 10 | 10 |
|  | Wetting and dispersing agent | Copolymer having acid group | Parts by mass | 1.0 | 1.0 | 1.0 | 1.0 | 1.0 | 1.0 |
|  |  | Alkylammonium salt of high-molecular weight polymer | Parts by mass | 0.5 | 0.5 | 0.5 | 0.5 | 0.5 | 0.5 |
|  | Thickening agent | Magnesium oxide | Parts by mass | 0.8 | 0.8 | 0.8 | 0.8 | 0.8 | 0.8 |
| Reinforcing fiber |  | Glass fiber (fiber length (25 mm)) | % | 45.0 | 50.0 | 30.0 | 27.0 | 29.0 | — |
|  |  | Glass fiber (fiber length (6 mm)) | % | — | — | — | — | — | 28.0 |
| Content by weight in molding material |  | Aluminum hydroxide | % | 19.4% | 14.0% | 38.1% | 48.9% | 45.9% | 42.4% |
|  |  | Expandable graphite | % | 2.8% | 2.8% | 1.8% | 1.0% | 0.6% | 1.7% |
| Content by volume in molding material |  | Filler-excluding component | vol % | 52.0% | 51.9% | 48.6% | 4.04% | 42.0% | 46.1% |
|  |  | Aluminum hydroxide | vol % | 14.1% | 10.3% | 28.4% | 38.4% | 35.9% | 32.1% |
|  |  | Calcium carbonate | vol % | — | — | — | — | — | — |
|  |  | Expandable graphite | vol % | 2.7% | 2.8% | 1.8% | 1.0% | 0.6% | 1.7% |
|  |  | Reinforcing fiber | vol % | 31.2% | 35.0% | 21.3% | 20.23% | 21.6% | 20.2% |

TABLE 3

|  |  |  |  | Unit | Comp. Ex. 1 | Comp. Ex. 2 | Comp. Ex. 3 | Comp. Ex. 4 | Comp. Ex. 5 |
|---|---|---|---|---|---|---|---|---|---|
| Unsaturated polyester resin composition | Resin component | Unsaturated polyester resin | Unsaturated polyester resin of Synthesis Example 1 | Parts by mass | 60 | 60 | 60 | 60 | 60 |
|  |  |  | Unsaturated polyester resin of Synthesis Example 2 | Parts by mass | — | — | — | — | — |
|  |  |  | Vinyl ester resin of Synthesis Example 4 | Parts by mass | 10 | 10 | 10 | 10 | 10 |
|  |  |  | Styrene | Parts by mass | 10 | 10 | 10 | 10 | 10 |
|  |  |  | Polyvinyl acetate solution | Parts by mass | — | — | — | — | — |
|  |  |  | Saturated polyester resin of Synthesis Example 3 | Parts by mass | — | — | — | — | — |
|  |  |  | Polystyrene solution | Parts by mass | 15 | 15 | 15 | 15 | 15 |
|  |  |  | polyethylene powder | Parts by mass | 5 | 5 | 5 | 5 | 5 |
|  | Aluminum hydroxide |  |  | Parts by mass | — | 150 | 40 | 320 | 150 |
|  | Calcium carbonate |  |  | Parts by mass | 170 | — | — | — | — |
|  | Expandable graphite |  | Expandable graphite A | Parts by mass | 7 | — | 7 | 7 | 1 |
|  |  |  | Expandable graphite B | Parts by mass | — | — | — | — | — |
|  |  |  | Expandable graphite C | Parts by mass | — | — | — | — | — |
|  |  |  | Expandable graphite D | Parts by mass | — | — | — | — | — |
|  | Flane retardant |  | OP 1230 (phosphorus-based flame retardant) | Parts by mass | — | — | — | — | — |
|  | Polymerization inhibitor |  | p-benzoquinone | Parts by mass | 0.05 | 0.05 | 0.05 | 0.05 | 0.05 |
|  | Curing agent |  | t-butyl peroxyisopropyl carbonate | Parts by mass | 1 | 1 | 1 | 1 | 1 |
|  | Release agent |  | Zinc stearate | Parts by mass | 5 | 5 | 5 | 5 | 5 |
|  | Coloring agent |  | Black polyester toner | Parts by mass | 10 | 10 | 10 | 10 | 10 |
|  | Wetting and dispersing agent |  | Copolymer having acid group | Parts by mass | 1.0 | 1.0 | 1.0 | 1.0 | 1.0 |
|  |  |  | Alkylammonium salt of high-molecular weight polymer | Parts by mass | 0.5 | 0.5 | 0.5 | 0.5 | 0.5 |
|  | Thickening agent |  | Magnesium oxide | Parts by mass | 0.8 | 0.8 | 0.8 | 0.8 | 0.8 |
| Reinforcing fiber |  |  | Glass fiber (fiber length (25 mm)) | % | 29.0 | 30.0 | 34.0 | 27 | 35 |
|  |  |  | Glass fiber (fiber length (6 mm)) | % | — | — | — | — | — |
| Content by weight in molding material |  |  | Aluminum hydroxide | % | 0.0% | 39.1% | 16.0% | 25.5% | 36.2% |
|  |  |  | Expandable graphite | % | 1.7% | 0.0% | 2.8% | 1.1% | 0.2% |
| Content by volume in molding material |  |  | Filler-excluding component | vol % | 48.3% | 50.2% | 65.5% | 34.1% | 47.2% |
|  |  |  | Aluminum hydroxide | vol % | 0.0% | 28.8% | 10.6% | 43.3% | 27.4% |
|  |  |  | Calcium carbonate | vol % | 28.4% | — | — | — | — |
|  |  |  | Expandable graphite | vol % | 1.8% | 0.0% | 2.5% | 1.3% | 0.2% |
|  |  |  | Reinforcing fiber | vol % | 21.6% | 21.0% | 21.4% | 21.3% | 25.2% |

TABLE 4

| | | | | Unit | Comparative Example No. | | | | |
|---|---|---|---|---|---|---|---|---|---|
| | | | | | Comp. Ex. 1 | Comp. Ex. 2 | Comp. Ex. 3 | Comp. Ex. 4 | Comp. Ex. 5 |
| Unstaurated polyester resin composition | Resin component | Unsaturated polyester resin | Unsaturated polyester resin of Synthesis Example 1 | Parts by mass | 60 | 60 | 60 | 60 | 60 |
| | | | Unsaturated polyester resin of Synthesis Example 2 | Parts by mass | — | — | — | — | — |
| | | | Vinyl ester resin of Synthesis Example 4 | Parts by mass | 10 | 10 | 10 | 10 | 10 |
| | | | Styrene | Parts by mass | 10 | 10 | 10 | 10 | 10 |
| | | | Polyvinyl acetate solution | Parts by mass | — | — | — | — | — |
| | | | Saturated polyester resin of Synthesis Example 3 | Parts by mass | — | — | — | — | — |
| | | | Polystyrene solution | Parts by mass | 15 | 15 | 15 | 15 | 15 |
| | | | polyethylene powder | Parts by mass | 5 | 5 | 5 | 5 | 5 |
| | Aluminum hydroxide | | | Parts by mass | 150 | 150 | 150 | 180 | 180 |
| | Calcium carbonate | | | Parts by mass | — | — | — | — | — |
| | Expandable graphite | Expandable graphite A | | Parts by mass | 20 | — | — | — | — |
| | | Expandable graphite B | | Parts by mass | — | — | — | — | — |
| | | Expandable graphite C | | Parts by mass | — | 7 | — | — | — |
| | | Expandable graphite D | | Parts by mass | — | — | 7 | — | 7 |
| | Flane retardant | OP 1230 (phosphorus-based flame retardant) | | Parts by mass | — | — | — | — | — |
| | Polymerization inhibitor | p-benzoquinone | | Parts by mass | 0.05 | 0.05 | 0.05 | 0.05 | 0.05 |
| | Curing agent | t-butyl peroxyisopropyl carbonate | | Parts by mass | 1 | 1 | 1 | 1 | 1 |
| | Release agent | Zinc stearate | | Parts by mass | 5 | 5 | 5 | 5 | 5 |
| | Coloring agent | Black polyester toner | | Parts by mass | 10 | 10 | 10 | 10 | 10 |
| | Wetting and dispersing agent | Copolymer having acid group | | Parts by mass | 1.0 | 1.0 | 1.0 | 1.0 | 1.0 |
| | | Alkylammonium salt of high-molecular weight polymer | | Parts by mass | 0.5 | 0.5 | 0.5 | 0.5 | 0.5 |
| | Thickening agent | Magnesium oxide | | Parts by mass | 0.8 | 0.8 | 0.8 | 0.8 | 0.8 |
| Reinforcing fiber | | Glass fiber (fiber length (25 mm)) | | % | 29.0 | 29.0 | 35.0 | — | — |
| | | Glass fiber (fiber length (6 mm)) | | % | — | — | — | 28.0 | 28.0 |
| Content by weight in molding material | | Aluminum hydroxide | | % | 36.9% | 38.7% | 35.4% | 43.4% | 42.4% |
| | | Expandable graphite | | % | 4.9% | 1.8% | 1.7% | 0.0% | 1.7% |
| Content by volume in molding material | | Filler-excluding component | | vol % | 46.8% | 48.9% | 45.7% | 47.3% | 46.1% |
| | | Aluminum hydroxide | | vol % | 27.6% | 28.8% | 27.1% | 32.7% | 32.1% |
| | | Calcium carbonate | | vol % | — | — | — | — | — |
| | | Expandable graphite | | vol % | 5.0% | 1.8% | 1.7% | 0.0% | 1.7% |
| | | Reinforcing fiber | | vol % | 20.7% | 20.6% | 25.5% | 20.1% | 20.2% |

TABLE 5

| | | Unit | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|
| Evaluation | Molding compression rate | % | 0.05 | 0.06 | 0.06 | 0.06 | 0.05 | −0.04 | 0.07 | 0.06 | 0.08 | 0.08 | −0.04 | 0.07 | 0.08 |
| | Flame retardancy 3 mm/V0 | — | Conformable | Conformable | Conformable | Conformable | Conformable | Conformable | Conformable | Conformable | Conformable | Conformable | Conformable | Conformable | Conformable |
| | 2.5 mm/V0 | — | Conformable | Conformable | Conformable | Conformable | Conformable | Conformable | Conformable | Conformable | Not conformable | Conformable | Conformable | Conformable | Conformable |
| | 2 mm/V0 | — | Not conformable | Not conformable | Not conformable | Not conformable | Not conformable | Not conformable | Not conformable | Not conformable | Not conformable | Not conformable | Conformable | Conformable | Not conformable |
| | Determination | — | Good | Good | Good | Good | Good | Good | Good | Good | Fair | Good | Excellent | Excellent | Good |
| | Extinguishing time after 2-min combustion of 3-mm plate | second | Less than 1 second | Less than 1 second | Less than 1 second | Less than 1 second | Less than 1 second | Less than 1 second | Less than 1 second | Less than 1 second | Less than 1 second | Less than 1 second | Less than 1 second | Less than 1 second | Less than 1 second |
| | Determination | — | Good | Good | Good | Good | Good | Good | Good | Good | Good | Good | Good | Good | Good |
| Product stability | Impregnation | — | Good | Good | Good | Good | Good | Good | Good | Good | Good | Good | Good | Good | — |
| Density | | g/mL | 1.85 | 1.85 | 1.85 | 1.85 | 1.85 | 1.86 | 1.82 | 1.76 | 1.78 | 1.80 | 1.90 | 1.89 | 1.83 |
| Flexural properties | Flexural modulus of elasticity | GPa | 13.8 | 13.1 | 13.5 | 13.5 | 12.8 | 13.9 | 14.5 | 14.6 | 14.8 | 12.6 | 13.5 | 13.4 | 12.5 |
| | Flexure strength | MPa | 280 | 258 | 272 | 274 | 246 | 277 | 302 | 305 | 310 | 232 | 202 | 200 | 113 |
| Tensile properties | Tensile modulus of elasticity | GPa | 14.1 | 13.1 | 13.8 | 14.2 | 12.9 | 14.2 | 15.4 | 15.6 | 15.8 | 12.8 | 13.6 | 13.5 | 12.8 |
| | Tensile strength | MPa | 138 | 127 | 134 | 138 | 120 | 137 | 149 | 151 | 156 | 113 | 95 | 89 | 42 |
| Impact properties | Izod impact strength | KJ/m² | 85 | 83 | 86 | 84 | 83 | 83 | 84 | 90 | 95 | 78 | 77 | 76 | 25 |

TABLE 6

| | | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|
| Evaluation | Molding compression rate | Compression rate | % | 0.07 | 0.08 | 0.12 | 0.06 | 0.06 | 0.06 | 0.06 | 0.06 | 0.07 | 0.07 |
| | Flame retardancy | 3 mm/V0 | — | Not conformable | Conformable | Not conformable | Conformable | Conformable | Conformable | Conformable | Conformable | Conformable | Conformable |
| | | 2.5 mm/V0 | — | Not conformable | Not conformable | Not conformable | Conformable | Not conformable | Conformable | Conformable | Conformable | Not conformable | Conformable |
| | | 2 mm/V0 | — | Not conformable | Not conformable | Not conformable | Conformable | Not conformable | Not conformable | Not conformable | Not conformable | Not conformable | Not conformable |
| | | Determination | — | Bad | Fair | Bad | Excellent | Fair | Good | Good | Good | Fair | Good |
| | Extinguishing time after combustion | Extinguishing time after 2-min combustion of 3-mm plate | second | More than 30 seconds | 10 seconds | Less than 1 second | Less than 1 second | 10 seconds | Less than 1 second | Less than 1 second | Less than 1 second | 10 seconds | Less than 1 second |
| | Product stability | Determination | — | Bad | Bad | Good | Good | Bad | Good | Good | Good | Bad | Good |
| | | Impregnation | — | Good | Good | Good | Bad | Good | Good | Good | Good | — | — |
| | Density | | g/mL | 1.89 | 1.78 | 1.60 | 2.00 | 1.83 | 1.81 | 1.80 | 1.80 | 1.82 | 1.83 |
| | Flexural properties | Flexural modulus of elasticity | GPa | 12.8 | 12.6 | 10.9 | 12.4 | 13.9 | 11.4 | 11.3 | 10.8 | 12.6 | 12.3 |
| | | Flexure strength | MPa | 235 | 231 | 209 | 198 | 277 | 196 | 151 | 132 | 114 | 90 |
| | Tensile properties | Tensile modulus of elasticity | GPa | 13.5 | 12.7 | 11.0 | 12.5 | 14.0 | 11.8 | 12.7 | 11.8 | 12.9 | 12.5 |
| | | Tensile strength | MPa | 119 | 113 | 104 | 85 | 137 | 97 | 74 | 65 | 41 | 33 |
| | Impact properties | Izod impact strength | KJ/m² | 80 | 79 | 76 | 70 | 84 | 70 | 69 | 60 | 24 | 20 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The unsaturated polyester resin composition, molding material, and molded article of the present invention are suitably used, for example, as battery cases for electric vehicles.

The invention claimed is:

1. An unsaturated polyester resin composition comprising:
   a resin component containing an unsaturated polyester and a polymerizable monomer;
   an aluminum hydroxide; and
   an expandable graphite, wherein
   a mixing ratio of the aluminum hydroxide to 100 parts by mass of the resin component is 50 parts by mass or more and 300 parts by mass or less,
   a mixing ratio of the expandable graphite to 100 parts by mass of the resin component is 3 parts by mass or more and 10 parts by mass or less, and
   an average particle size of the expandable graphite is 150 μm or less.

2. The unsaturated polyester resin composition according to claim 1, further comprising a wetting and dispersing agent, wherein the wetting and dispersing agent is an alkylammonium salt.

3. A molding material comprising:
   the unsaturated polyester resin composition according to claim 1; and
   a reinforcing fiber.

4. The molding material according to claim 3, being a sheet molding compound.

5. A molded article comprising a cured product of the molding material according to claim 3.

* * * * *